No. 802,640. PATENTED OCT. 24, 1905.
D. J. HANNA.
DOUGH DIVIDER.
APPLICATION FILED MAR. 23, 1905.

2 SHEETS—SHEET 1.

Witnesses
Edwin L. Yewell
Thomas Durant

Inventor
David J. Hanna
By Church & Church
his Attorneys

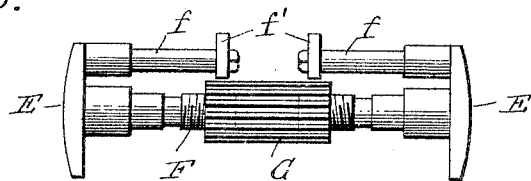
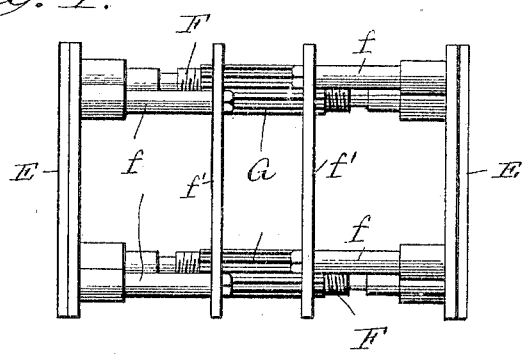
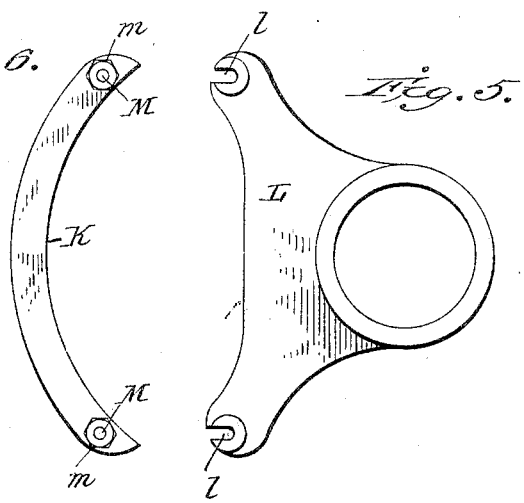
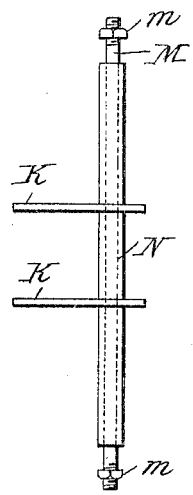

UNITED STATES PATENT OFFICE.

DAVID J. HANNA, OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

DOUGH-DIVIDER.

No. 802,640. Specification of Letters Patent. Patented Oct. 24, 1905.

Application filed March 23, 1905. Serial No. 251,652.

*To all whom it may concern:*

Be it known that I, DAVID J. HANNA, a citizen of the United States, residing at Fishkill-on-the-Hudson, in the county of Dutchess and State of New York, have invented certain new and useful Improvements in Dough-Dividers; and I do hereby declare the following to be a full, clear, and exact description of the same, reference being had to the accompanying drawings, forming a part of this specification, and to the letters of reference marked thereon.

This invention relates to a type of dough-dividers now on the market and well illustrated in the pending applications of F. H. Van Houten, Serial No. 207,837, filed May 13, 1904, and Serial No. 238,949, filed December 30, 1904, the object of this invention being to simplify and improve the construction of the measuring portion of the dough-divider and in a large measure do away with the necessity of duplicating the chambers and followers for the subdivision of the dough.

The invention consists, primarily, in a measuring mechanism for dough-dividers embodying a measuring-head adapted to receive a charge of dough at one point and transfer the same to another point for its discharge and a separate means whereby said dough will be subdivided as it is discharged from the measuring-receptacle. The mechanism for subdividing the dough is thus made separate from and independent of the measuring-receptacle, and consequently said receptacle instead of being subdivided by partitions, as heretofore, may be in the form of a single chamber, in which the dough can be uniformly compressed by the forcing mechanism.

Specifically the invention consists in a rotary head having measuring-receptacles adapted to receive the dough from the forcing mechanism at one point and transfer the dough to the discharging-point and a series of knives adapted to bridge the receptacles at the discharging-point and subdivide the dough during its discharge.

The invention further consists in certain novel details of construction and combinations and arrangements of parts, all as will be now described, and pointed out particularly in the appended claims.

Figure 1:
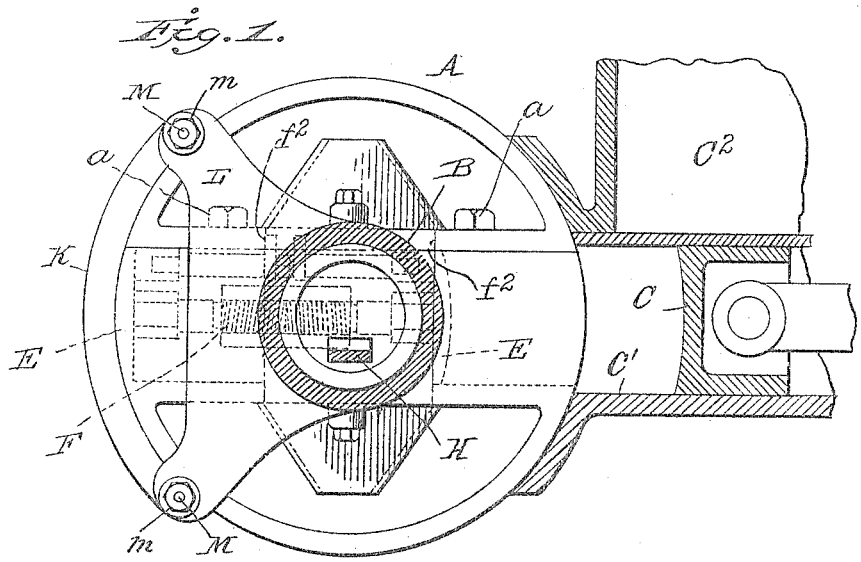
Figure 2:
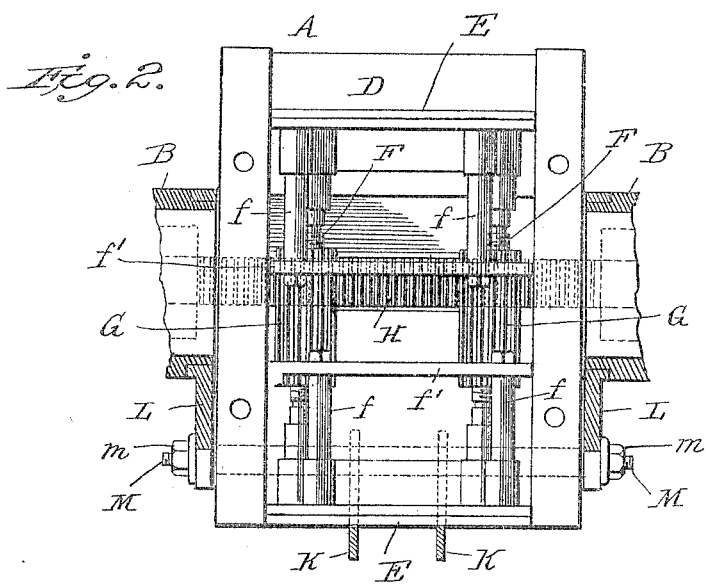

Referring to the accompanying drawings, Figure 1 is a side elevation, partly in section, of the measuring-head of a dough-divider with some of its associated parts. Fig. 2 is a horizontal section with the upper segment of the measuring-head and upper part of the subdividing-knives removed. Fig. 3 is a side elevation, and Fig. 4 a plan, of the followers mounted in the measuring-head. Figs. 5 and 6 are respectively a detail side elevation of the knife-supporting frame and of the knives themselves. Fig. 7 is a plan of the connected knives removed from their supporting-frames.

Like letters of reference in the several figures indicate the same parts.

As shown in the accompanying drawings, the rotary head A is journaled to rotate in suitable bearings B, carried by the main frame, and is adapted to have its measuring-receptacles brought into registry with a dough-forcing mechanism, which may consist in part of a plunger C, working in a channel $C'$ beneath a hopper $C^2$ in the well-understood manner. The measuring-head is preferably in sections connected by bolts or screws $a$, and it is formed with a channel extending diametrically through the same and adapted to form at each end a measuring-receptacle D, in each of which a follower E is adapted to work, said followers being adjustably connected together by screw-stems F and pinion sleeves or nuts G. The pinion sleeves or nuts G are geared together through the medium of a rack-bar H, so as to be simultaneously rotated to move the followers toward or from each other for adjusting the capacity of the measuring-receptacles, and parallel screw-stems are employed in order to maintain the parallelism of the followers E, which in this instance, it will be noted, are relatively long, each measuring-receptacle being adapted to receive a charge equal to the combined volume of a number of loaves of bread. In addition to the screw-stems F the followers E are provided with fixed stems $f$, the stems $f$ on each follower being connected by a stop-bar $f'$, adapted to contact with a shoulder $f^2$ in the head to limit the outward movement of the followers. The shoulders $f^2$ and bars $f'$ being relatively long will insure the arresting of the movement of the followers when the faces of the latter are flush with the periphery of the measuring-head and will correct any tendency of said followers to get out of parallelism either with each other or with the surfaces of the head itself.

In operation the dough is forced into one receptacle, and the pressure thus exerted on the follower in that receptacle is transferred through the connecting mechanism to the follower in the other receptacle and serves to discharge the dough from the latter. In the present invention a knife or knives is or are provided in position to bridge the receptacles at the discharging-point, and consequently as the dough is discharged it will be subdivided into the proper-sized masses to constitute loaves of the desired weight. As shown in the drawings, the mass of dough in each receptacle is sufficient to form three loaves, and hence two knives K are provided in position to subdivide the dough into three equal parts as it is being discharged. These knives K are preferably segmental in form and fit closely to the surface of the measuring-head in proximity to the discharging-point. As a convenient means for supporting them in position and providing for their ready removal or adjustment each bearing B is provided with forwardly-extending projections or arms in the form of a bracket L, to the ends of which transverse knife-supporting rods M may be attached in any suitable manner. The rods M, as shown, are adapted to fit into slot-bearings *l* in the bracket and to be held or clamped in place by nuts *m*, while the knives are properly spaced on the rods by spacers or sleeves N. (Best illustrated in Fig. 7 of the accompanying drawings.) Obviously any desired number of knives may be located on the rod and the sleeves N subdivided to properly position said knives for accurately subdividing the mass of dough as it is discharged from the measuring-receptacles, and the knives may be adjusted laterally by shifting the positions of the nuts *m* or by other well-known means.

With the construction described it will be seen that the measuring-receptacles are very much simplified in that but a single chamber and single plunger are necessary on each side of the head instead of the duplicity of these parts as heretofore.

In operation it will be seen that the dough pushed into the measuring-head by the forcing mechanism will distribute itself evenly throughout the whole chamber or receptacle at a uniform density, and thus when said dough is discharged each part of the same separated from the other by the severing-knives will be uniform in density and dimension. The knives being entirely outside of the measuring-head may be readily cleaned and kept in perfect condition, while the measuring-receptacles themselves being of relatively large dimensions may be readily cleaned and kept in perfect condition without the necessity of separating the parts of the head or otherwise taking down the machine when cleaning becomes desirable.

Having thus described my invention, what I claim as new, and desire to secure by Letters Patent, is—

1. In a measuring mechanism for dough-dividers, the combination with a movable head having measuring-receptacles therein adapted to receive the dough at one point and discharge the same at another, of a severing-knife for subdividing the dough located in position to bridge the measuring-receptacle at the discharging-point; substantially as described.

2. In a measuring mechanism for dough-dividers, the combination with the measuring-head having measuring-receptacles therein adapted to receive the dough at one point and discharge it at another, of a fixed knife located in position to bridge the receptacle at the discharging-point and a forcing mechanism for filling the receptacle at the receiving-point; substantially as described.

3. In a measuring mechanism for dough-dividers, the combination with the rotary head having measuring-receptacles therein, a forcing mechanism for filling said receptacles and a fixed knife adapted to bridge the receptacle at the discharging-point; substantially as described.

4. In a measuring mechanism for dough-dividers, the combination with the rotary head having measuring-receptacles therein, followers in said receptacles and connections between said followers, of a forcing mechanism for forcing dough into the receptacle on one side of said head and simultaneously discharging the dough from the receptacle on the opposite side of the head, and a fixed knife bridging the receptacle at the discharging-point for subdividing the dough as it is discharged.

5. In a measuring mechanism for dough-dividers, the combination with the rotary head having measuring-receptacles therein, followers in said receptacles connected for simultaneous movement in opposite directions and a forcing mechanism for filling one of said receptacles and simultaneously discharging dough from the opposite receptacle, of a fixed knife having a segmental edge bridging the receptacles at the discharging-point for subdividing the dough as it is discharged; substantially as described.

6. In a measuring mechanism for dough-dividers, the combination with the cylindrical measuring-head having diametrically-arranged measuring-receptacles therein and connected followers working in said receptacles, of a forcing mechanism located on one side of said head and a fixed knife on the opposite side of said head in position to bridge the measuring-receptacles at the discharging-point.

7. In a dough-divider, the combination with the cylindrical head, having diametrically-arranged measuring-receptacles therein, connected followers in said receptacles and a forcing mechanism for filling one receptacle and simultaneously discharging dough from the opposite receptacle, of knife-supporting brackets at each end of the head, carrying-rods in said brackets and segmental knives mounted on said rods in position to bridge the receptacles at the discharging-point and subdivide the dough as it is discharged.

8. In a dough-dividing machine, the combination with the rotary cylindrical head, having oppositely-arranged measuring-receptacles therein, connected followers in said receptacles and a forcing mechanism for filling one receptacle and simultaneously discharging dough from the opposite receptacle, of fixed brackets at each end of the measuring-head, removable rods connecting said brackets, and segmental knives mounted on the rods in position to bridge the receptacles at the discharging-point and subdivide the dough as it is discharged; substantially as described.

9. In a dough-divider, the combination with the cylindrical measuring-head having oppositely-arranged measuring-receptacles therein, connected followers in said receptacles and forcing mechanism for filling one receptacle and simultaneously discharging the dough from the opposite receptacle, of fixed brackets at each end of the head, rods mounted in slot-bearings in said brackets and segmental knives carried by said rods in position to bridge the receptacles at the discharging-point and subdivide the dough during its discharge; substantially as described.

10. In a measuring mechanism for dough-dividers, the combination with the rotary head having oppositely-arranged measuring-receptacles therein, elongated followers in said receptacles, separate parallel adjusting mechanisms interposed between said followers at each end and geared together for simultaneous adjustment, a forcing mechanism for filling the receptacle, and fixed knives bridging said receptacles at the discharging-point for subdividing the dough as it is discharged; substantially as described.

DAVID J. HANNA.

Witnesses:
J. E. VAN HOUTEN,
C. VAN NOSTRAN.